2 Sheets—Sheet 1.

S. H. EDGERLY.

EQUALIZING TRAP FOR LUBRICATORS FOR STEAM ENGINES.

No. 9,927. Reissued Nov. 15, 1881.

WITNESSES.

Samuel E. Thomas.

Henry F. Ludeke

Saml. H. Edgerly INVENTOR.

By W. W. Leggett. ATTORNEY.

N. PETERS. Photo-Lithographer, Washington, D. C.

S. H. EDGERLY.

EQUALIZING TRAP FOR LUBRICATORS FOR STEAM ENGINES.

No. 9,927. Reissued Nov. 15, 1881.

WITNESSES.
Samuel E. Thomas,
Henry A. Duelch

Saml. H. Edgerly
By L. W. Seggern.

INVENTOR.

ATTORNEY.

N. PETERS, Photo-Lithographer, Washington, D. C.

UNITED STATES PATENT OFFICE.

SAMUEL H. EDGERLY, OF JACKSON, MICHIGAN.

EQUALIZING-TRAP FOR LUBRICATORS FOR STEAM-ENGINES.

SPECIFICATION forming part of Reissued Letters Patent No. 9,927, dated November 15, 1881.

Original No. 224,159, dated February 3, 1880. Application for reissue filed January 13, 1881.

*To all whom it may concern:*

Be it known that I, SAMUEL H. EDGERLY, of the city of Jackson, in the county of Jackson and State of Michigan, have invented a new and useful Improvement in Equalizing-Traps for Lubricators for Steam-Engines, which improvement is fully set forth in the following specification and accompanying drawings, in which—

Figure 1:
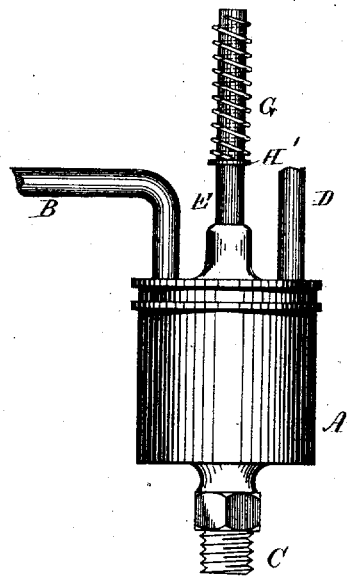
Figure 2:
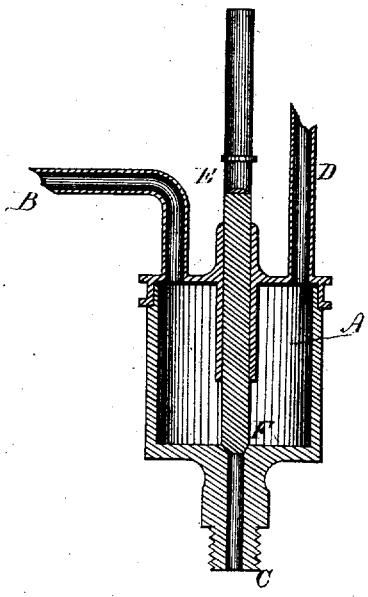
Figure 3:
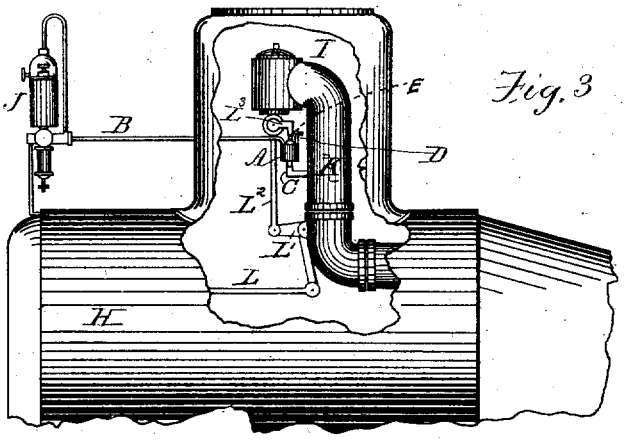
Figure 4:
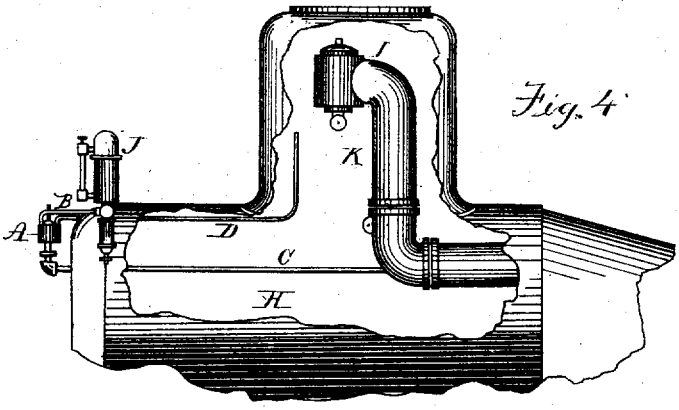

Figure 1 is an elevation of the trap. Fig. 2 is a vertical section of the trap. Fig. 3 is a broken side elevation of a boiler, showing the trap inclosed in the steam-dome with the valve connected to the throttle-actuating mechanism; and Fig. 4 is a broken side elevation of a boiler, showing the trap on the outside of the boiler.

Like letters denote like parts in each figure.

My invention relates to that class of lubricators in which the oil is fed into the dry-pipe of a steam-engine by either steam or hydrostatic pressure; and it consists in an equalizing-trap so connected with the oil-pipe of the lubricator, the dry-pipe of the engine, and the inside of the steam-dome that when the steam is cut off from the engine there will be a constant steam-pressure in the trap, and any sudden flow of oil from the lubricator into the dry-pipe will be prevented; also, in providing the oil-exit conduit of a lubricator with a valve so connected with the throttle-valve-actuating mechanism that the valve in the oil-exit conduit shall thereby be opened and closed as the throttle-valve is actuated.

As such lubricators are at present applied to steam-engines with an oil-pipe leading directly from the lubricator into the dry-pipe, with no communication with the inside of the boiler, when steam is cut off from the engine and the steam-pressure taken off from the lubricator the expansion of steam thereby caused in the lubricator suddenly forces a quantity of oil into the dry-pipe, and when steam is again turned onto the engine the lubricator will not at once feed oil, but will remain inoperative for some length of time. This is especially noticeable in engines using a high steam-pressure.

The construction of my improvement is as follows:

A is a trap, constructed of metal of proper thickness.

B is the oil-pipe of the lubricator, leading into the trap.

C is the oil-pipe leading from the trap to the dry-pipe.

D is a steam-pipe opening from the trap into the steam-dome of the boiler.

E is a valve in the trap, of which F is the seat.

G is a coil-spring around the upper end of the valve-rod.

H is a boiler, of which I is the steam-dome.

K is the dry-pipe or steam-pipe to the engine.

In Fig. 3 the trap is shown placed inside of the steam-dome. The oil-pipe B runs from the lubricator J to the trap A, and from the bottom of the trap A the oil-pipe C runs into the dry-pipe K. The valve-rod E is shown connected by an arm, $L^3$, to the throttle-valve, so that the valve E will be opened when the throttle is opened, and closed when the throttle is closed.

The arm $L^3$ from the throttle-valve may be fastened to a collar, H′, sliding on the valve-rod E, and any difference of travel between the throttle-valve and valve E will be taken up and compensated by the coil-spring G, Fig. 1.

The steam-pipe D opens from the trap to the steam-dome, so that the steam-pressure in the boiler is communicated through the pipe D, trap A, and pipe B to the interior of the lubricator J.

When the trap is placed in the steam-dome, as in Fig. 3, the pipe D may be dispensed with, and the valve-rod E may fit loosely in the top of the trap A, so that steam may pass into the trap around said valve-rod. In the drawings, Fig. 3, the valve-rod E is shown attached to and worked from the throttle-valve.

I do not claim this connection, nor do I claim any particular mode of operating the valve E, as any valve may be used which will close pipe C, and may be operated in any manner which may best suit the convenience of the engineer. In Fig. 4 the trap is shown arranged outside of the boiler, in which case the trap connects with the steam-dome through the medium of pipe D, as illustrated. Under such arrangement ready access can be had to the equalizing-trap; but I would have it distinctly understood that, without laying any claim to any specific construction or connection of these parts, I claim, broadly, the feature of providing the oil-exit conduit of a lubricator with a valve for cutting off the flow of oil to the dry-pipe, and connecting that valve with the throttle-actuating mechanism so as to be opened and closed by that mechanism, and also in providing a lubricator which has a valve in its oil-exit conduit, with a relief-passage connecting a point back of the said valve with the boiler-pressure, so that at any time the valve is closed so as to shut off the flow of oil to the dry-pipe the equalization of pressure within the lubricator will be maintained.

The operation of the trap is as follows: When the throttle is closed the valve E should be closed, thus preventing any flow of oil through the pipe C into the dry-pipe K. The steam-pressure in the boiler passing through pipe D, or through the opening through which the valve-rod E passes into the trap A, and through the pipe B into the lubricator J, maintains a constant pressure in the lubricator, and prevents the sudden flow of oil from the lubricator, which would follow if there were no opening from the trap A into the boiler. When the throttle is opened the valve E should be opened to permit the passage of oil from the trap A through the pipe C, and the lubricator will at once begin to feed oil into the dry-pipe K.

L is the throttle-rod, which is connected with the bell-crank L′, and actuates the connecting-rod $L^2$, which lifts the throttle, and in rising the latter lifts the arm $L^3$, which actuates the valve, so that as the throttle is opened the valve is opened, and vice versa.

What I claim is—

1. The combination, with a lubricator and the dry-steam pipe of a steam-boiler, of a valve located in the oil-conduit leading from the lubricator into the dry-steam pipe, and connected with the throttle-actuating mechanism so as to be opened and closed by said mechanism when the throttle is actuated, substantially as and for the purpose set forth.

2. The combination, with a lubricator and the dry-steam pipe of a steam-boiler, substantially as described, of a valve located in the oil-conduit leading from the lubricator to the dry-steam pipe, an oil-trap arranged in said oil-conduit, and a relief-pipe connecting the boiler-pressure with the passage through the trap, substantially as and for the purpose set forth.

3. The combination, with a throttle, steam-pipe governed thereby, and the lubricator having an oil-exit passage leading therefrom, of a valve located in said oil-exit passage, and connected with the throttle-actuating mechanism by a yielding spring-connection arranged to permit the throttle-lever to move through a limited space after the oil-valve is closed, substantially as described.

4. In combination with a lubricator for steam-engines, an equalizing-trap the interior of which is in free communication with the interior of the lubricator and the steam in the boiler, and which has an oil-pipe leading from it to the dry-pipe or steam-pipe of the engine, and a valve by which said oil-pipe can be closed, substantially as shown and described.

5. An equalizing-trap for lubricators for steam-engines, connected by a pipe with the interior or steam-dome of the boiler, having an oil-pipe, with a valve for closing the same, leading therefrom to the dry-pipe attached to the oil-pipe of the lubricator, substantially as shown and described.

6. The combination of the lubricator J, pipe B, trap A, pipe D, or its equivalent, pipe C, valve E, and dry-pipe K, substantially as herein shown and described.

7. In combination with a lubricator for steam-engines, the equalizing-trap A, pipe D, or its equivalent, pipe C, and valve E, substantially as herein shown and described.

8. The equalizing-trap A, having pipe D, pipe C, and valve E, constructed, arranged, and operating substantially as herein shown and described.

In testimony whereof I sign this specification in presence of two witnesses.

SAMUEL H. EDGERLY.

Witnesses:

HENRY C. HODGES,
W. C. LEWIS.